Oct. 14, 1952 L. E. STEIMEN 2,613,897
VIBRATION DAMPING MOUNT FOR MACHINES
Filed May 19, 1948 3 Sheets-Sheet 1

Inventor
Lawrence E. Steimen
By his Attorney

Oct. 14, 1952     L. E. STEIMEN     2,613,897
VIBRATION DAMPING MOUNT FOR MACHINES
Filed May 19, 1948     3 Sheets-Sheet 2
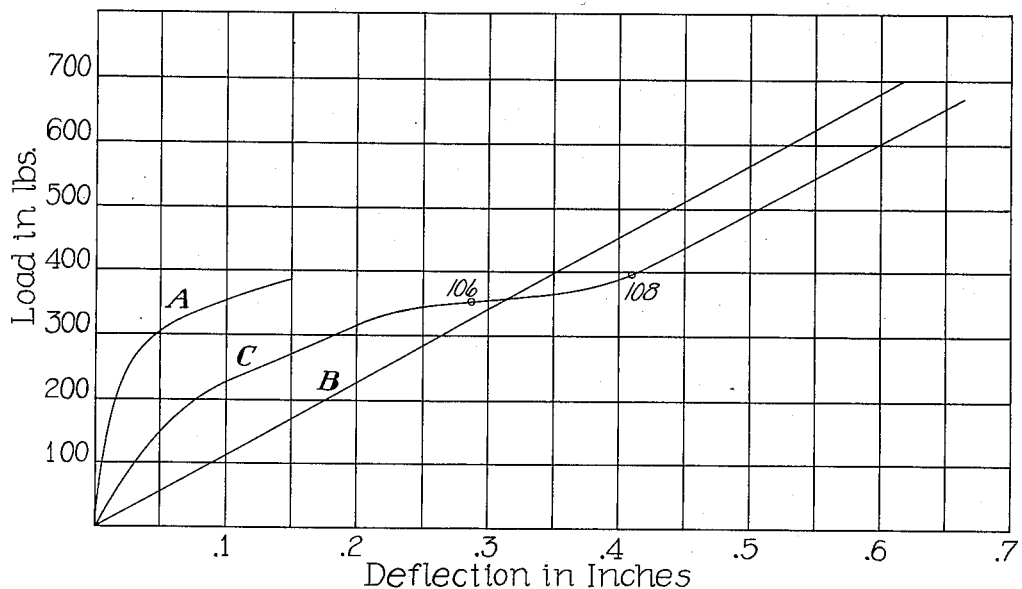
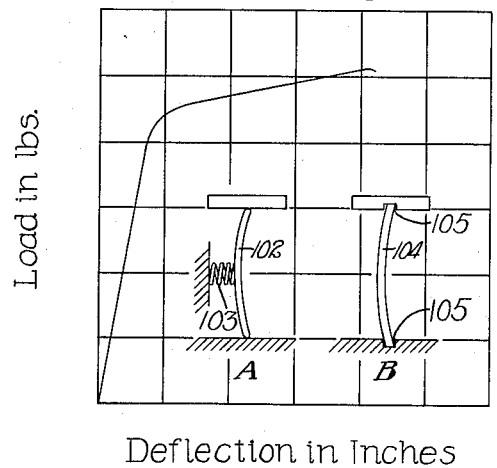
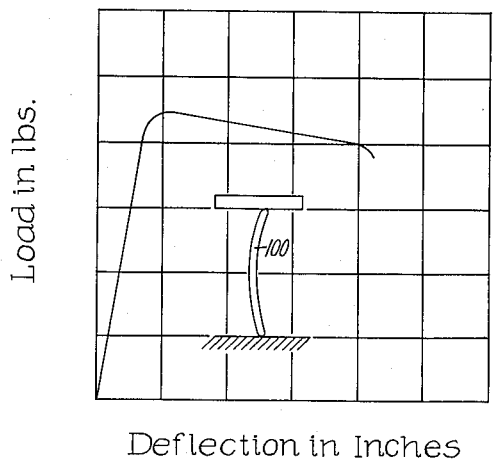
Inventor
Lawrence E. Steimen
By his Attorney Oct. 14, 1952 — L. E. STEIMEN — 2,613,897
VIBRATION DAMPING MOUNT FOR MACHINES Filed May 19, 1948 — 3 Sheets-Sheet 3

Inventor
Lawrence E. Steimen
By his Attorney

Patented Oct. 14, 1952

2,613,897

UNITED STATES PATENT OFFICE 2,613,897

VIBRATION DAMPING MOUNT FOR MACHINES

Lawrence E. Steimen, Beverly, Mass., assignor to United Shoe Machinery Corporation, Flemington, N. J., a corporation of New Jersey Application May 19, 1948, Serial No. 27,865

6 Claims. (Cl. 248—18)

This invention relates to vibration-damping devices and is herein illustrated as embodied in mounts for machines of the press type.

Considerable difficulty has heretofore been experienced in connection with machines in the operation of which considerable pressure is applied to a work piece over a short period of time as in presses such as clicking machines or sole cutters, or in which sharp blows are delivered to a work piece as in fastening-driving machines. In such machines the forces resulting from the machine operation are suddenly transmitted to the floor in such manner as to produce undesirable vibrations usually accompanied by considerable noise, in many instances seriously affecting the floor and adjoining structures and rendering working conditions unsatisfactory.

In view of the foregoing, it is an object of the present invention to provide an improved mount for machines which will be particularly effective in damping the forces applied to the floor resulting from the operation of machines of the impact type. It is proposed to accomplish this by limiting the amplitudes of the peak forces transmitted and by extending the time cycle of application of all the forces involved so that the forces are gradually applied to the floor over an appreciable length of time rather than as by a sudden blow.

To this end, and as illustrated, there is provided a vibration-damping mount for machines in which there are a base and a plurality of yielding devices mounted in series and extending upwardly from the base, one of the devices comprising a pair of vertical columns or struts, together with a platform for supporting a machine and means operatively connecting the platform to the upper ends of the columns so that the machine is yieldingly supported above the base. Preferably the spring scale of one of the yielding devices is high and the spring scale of the other is comparatively low with the result that the combined spring scale of the two devices mounted in series is comparatively low so that the dynamic forces initially applied to the platform will result in a flexing of the yielding devices after the manner of a weak spring. As shown, the yielding columns are so constructed and arranged that they deflect sufficiently under the static load of a machine supported upon the platform, until they assume a shape in which they have a low spring scale, there being provided means for arresting the deflections of the columns upon application of a predetermined dynamic loading so that the forces subsequently applied act upon the yielding device of comparatively large spring scale in transmitting the forces to the floor.

It has been found that by supporting a machine with a mount of the type aforementioned, positioned under each leg of the machine, the amplitude of vibrations transmitted to the floor is materially reduced to such an extent that the operation of the machine has little effect upon the building structure supporting it and the attendant noise of operation is markedly reduced.

These and other features of the invention are set forth in the following specification, are disclosed in the accompanying drawings, and are pointed out in the claims.

In the drawings,

Figs. 5 and 6 are diagrammatic views illustrating the operation of yielding columns under varying loads; and Fig. 7 is a diagrammatic view illustrating the operation of a column supported at its ends and a coil spring under compression, and the operation of such a column and a coil spring in series under varying loads.

Figure 1:
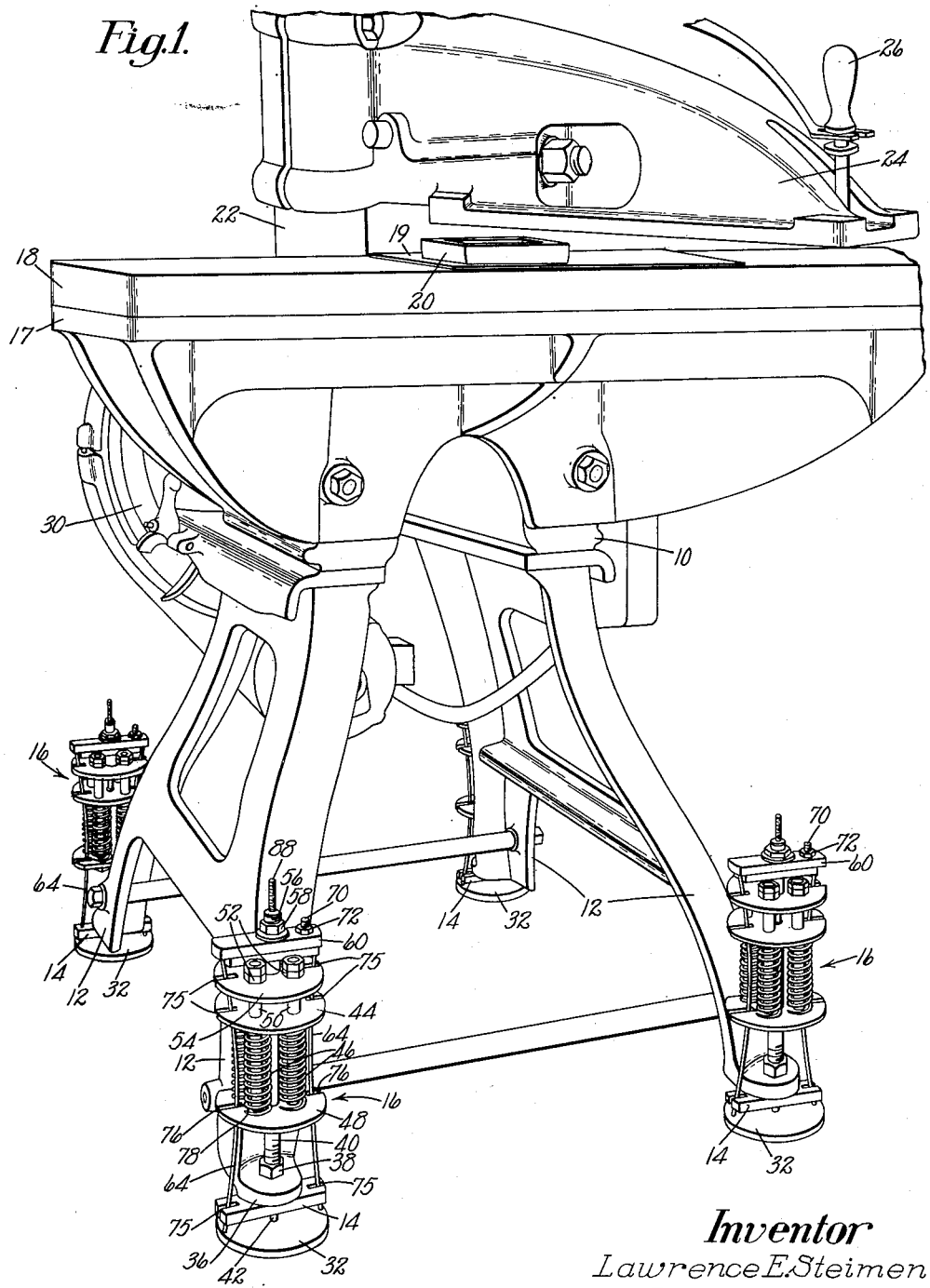
Fig. 1 is a perspective view of a clicking machine supported on vibration-damping mounts which embody one form of my invention.

The invention is illustrated, by way of example, in connection with a clicking machine which, as shown in Fig. 1, comprises a frame 10 having four legs 12 which rest upon machine supports or platforms 14 forming parts of four shock mounts 16 embodying the invention.

The machine itself is of a well-known type such as is disclosed in United States Letters Patent No. 921,503, granted May 11, 1909, upon an application filed in the name of Arthur Bates, and comprises a bed 17, supported upon the frame 10, and carrying a cutting block 18, upon which may be located sheet material 19, such as leather, to be operated upon, and a die 20 resting upon the material. At one side of the bed there is mounted for vertical reciprocation a post 22 carrying a beam 24 which is movable heightwise of the block with the post and is also movable laterally across the block about the axis of the post. The post is arranged to be reciprocated, upon depression of a starting handle 26, by mechanisms not shown, operatively connected to a flywheel 30. In the usual operation of such a machine the beam is moved into position over the die and depression of the starting handle initiates a pressure applying operation of the beam to force the die through the material to produce a blank. It is the inertia forces of the parts set in motion and the forces due to impact initiated by such an operation that the present invention seeks to damp by means of the shock mounts 16 supporting the machine.

Figure 2:
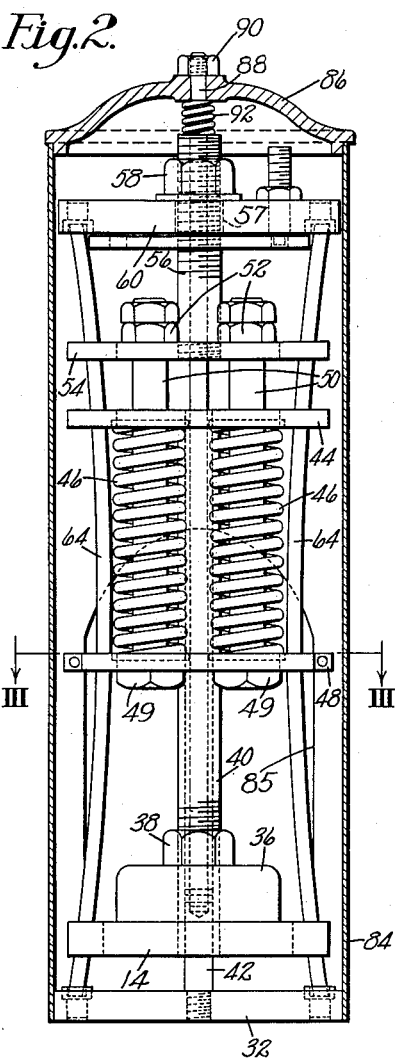
Fig. 2 is a view in side elevation, partly in section, of one of the mounts.
Figure 4:
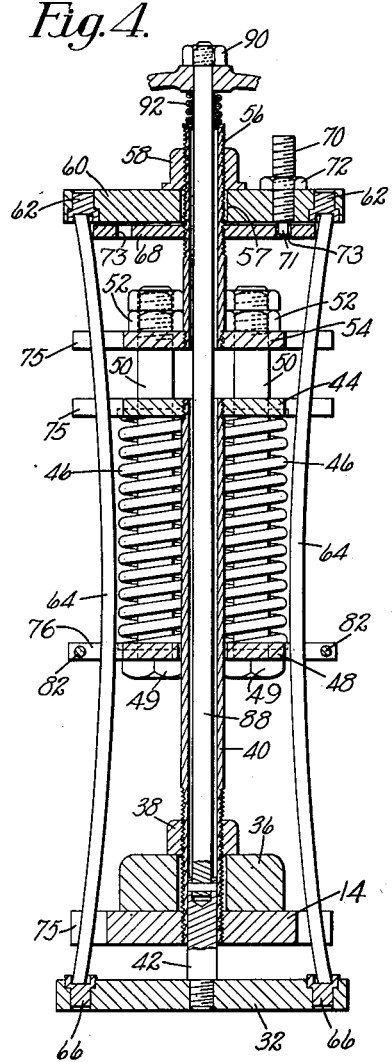
Fig. 4 is a view in vertical cross section through the mount.
Figure 3:
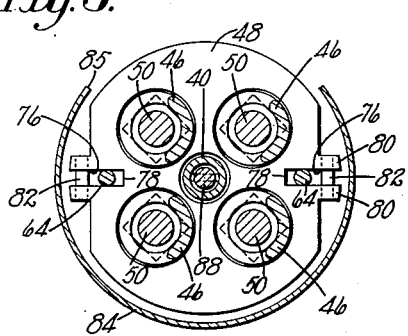
Fig. 3 is a cross sectional view taken along the lines III—III of Fig. 2.

As best shown in Figs. 2 and 4, each of the mounts comprises a base plate 32 above which is positioned the machine support or platform 14 secured to a flange 36 of a leg 12 of the machine by means of a nut 38 threaded upon a tube 40 slidable up and down on a pin 42 fastened to the central portion of the base 32. At its upper extremity the tube 40 has secured thereto a spring abutment in the form of a plate 44 which rests upon four stiff coil springs 46 bearing upon a spring abutment or plate 48, slidably mounted on the tube 40, and carried upon heads 49 on the lower ends of rods 50 extending through the springs 46. The rods are slidable in the plate 44 and serve to transfer the load applied to the abutment 48, by means of jam nuts 52, to a hanger in the form of a plate 54. A threaded stud 56 extends upwardly from the hanger 54 and through an opening 57 in a crosshead 60 resting upon the upper ends of columns or struts 64. The stud and the parts carried by it are supported by a nut 58, on the upper end of the stud, engaging the upper face of the crosshead. The underside of the crosshead 60 is provided with inset sockets 62 which receive the upper ends of columns 64, the lower ends of which are inserted in similar sockets 66 set in the upper face of the base plate 32.

The columns or struts 64 are in the form of slender rods preferably constructed of spring steel and are initially bowed slightly prior to assembly in the mount. This insures that the columns will yield appreciably under application of loads to their upper ends instead of acting as rigid columns. By supporting the ends of the columns in the sockets 62 the columns are stiffened sufficiently that under the dead load of the machine supported, they tend to assume a configuration in which they have a low spring scale but are not flexed to the point of failure.

The construction above described is such that the entire load applied to each machine leg is supported upon the platforms 14 and transmitted through the various connections described, to the bases 32. By adjusting the nut 58 on the stud 56 the hanger 54 can be raised or lowered to position the platform slightly, preferably a few inches, above the base plate 32.

Means is provided for varying the initial stiffness of the columns 64 so that each mount can be adjusted to different static loads applied to the platform without materially varying the combined spring scale of the columns and springs. To this end, there is provided a circular plate 68 threaded upon the stud 56. The plate is of a diameter such that its periphery engages the columns 64 near their upper ends when the plate is positioned close to the crosshead 60. The plate 68 can be adjusted heightwise of the stud 56 and columns 64 by rotating the plate on the stud. The plate is arranged to be locked in adjusted position by a screw 70, mounted in the crosshead, and having a pin 71 which can be positioned in any one of several holes 73 in the plate. The screw 70 can be adjusted heightwise of the columns 64 so that it extends to the plate in adjusted position, and can be locked in fixed position by nut 72. The stiffness of the columns is increased as the plate 68, in its adjusted position, engages the columns at greater distances from their upper ends.

The platforms 14, plate 44 and hanger 54 at opposite sides thereof each has slots 75 the walls of which provide guides for the columns 64 and to permit movement thereof radially of the axis of the mount. The plate 48 which is located comparatively near to the central portions of the columns and consequently in proximity to the positions of maximum deflection of the columns is provided with a similar pair of slots 76 the side walls of which act as guides for movement of the columns radially of the plate. However, in this case the end portions 78 of the slots form abutments so positioned as to limit inward movement of columns beyond a predetermined amount, and upon contact with such end portions the yielding columns become substantially fixed, that is, they no longer bow inwardly upon application of additional loads. The plate 48 is provided with ears 80, Fig. 2, adjacent to the slots 76, which support pins 82 extending across the slots and thus providing means preventing the columns 64 from leaving the slots when moved in an outward direction.

The mechanism of each mount is protected by a casing comprising an upstanding cylindrical tube 84, Fig. 2, having at the upper end thereof a cap 86 which extends over the upper end of an extension 88 of the rod 42, and is secured in position by a nut 90 threaded upon the rod 88 and a spring 92 surrounding the rod 88 and bearing against the underside of the cap 86 and against the upper end of the stud 56. The tube 84 has an opening 85, for receiving the leg of a machine to be supported.

In the use of shock mounts of the construction above described, for example, in supporting a clicking machine, a mount is provided for each leg of the machine, the legs preferably being bolted to the platforms 14 of the mounts. The nuts 58 are adjusted along the studs 56 until each leg of the machine is raised a short distance above the base 32. The forces due to the dead weight of the machine applied to each mount will then act successively through the platform 14, the tube 40, plate 44, coil springs 46, plate 48, rods 50, hanger 54, stud 56, and crosshead 60, to load the bowed columns 64 which in turn will transmit the forces to the base 32 and to the floor.

Under the static load the columns will be further deflected inwardly until equilibrium is reached, the columns acting as springs, the stiffness of which can be varied as required for different static loads over a considerable range by adjustment of the plate 68 heightwise of the columns.

When the machine thus supported is operated the inertia forces arising will be transmitted to the floor initially through the coil springs and columns acting in series and with a comparatively low spring scale, resulting in the transmission to the floor of the peak forces without impact. When the columns have been deflected until they engage the inner walls 78 of the slots in the plates 48, the columns are stiffened until they are substantially rigid, and, thereafter, the coil springs act alone in damping the remaining forces transmitted to the floor while the moving machine parts are brought to rest.

Figs. 5, 6 and 7 are for the purpose of amplifying the explanation of the operation of the present construction. It is to be noted that if a vertical column unsupported laterally at its ends is subject to a vertically-applied load the column would be deflected after the manner of the column 100 shown in the diagram of Fig. 5. Fig. 5 also shows the characteristic curve of the deflection of such a column in inches plotted against the load in pounds. It will be noticed that this curve rises rapidly to a certain point and then turns downwardly which means that after a certain load is reached, deflection will increase rapidly without further application of load and the column will fail. In Fig. 6, diagram A shows a similar column 102 unsupported at its ends but having a resilient lateral support 103. The equivalent of this column is shown in diagram B in which the ends of the column 104 are laterally supported in sockets 105. The characteristic deflection curve of these columns is also shown in Fig. 6. In this connection it is to be noted that the deflection slowly increases for increases in load up to a particular value after which the deflection rapidly increases for small increments of load. In other words, a column laterally supported at its ends acts similarly to a stiff spring up to a certain point after which the deflection of the column increases rapidly with the load and the column deflects after the manner of a weak spring or a spring of low spring scale.

Use is made of this principle in the mounts above described, it being noted that the columns 64 are supported at their ends in the sockets 62 and 66. Thus if the stiffness of the columns is adjusted by means of a plate 68 to an amount such that the portion of the dead weight of a machine which is carried by a particular mount corresponds to the loading at about the point where the deflection curve starts to flatten out, the columns will be in condition to act as a weak spring upon the application of additional load resulting from the action of dynamic forces such as resulting from impact. Since the columns act as a weak spring and are in series with the coil springs 46 which are of high spring scale the resultant spring scale of the system will still be low and, consequently, the time cycle of transmission of the forces involved to the floor will be increased with the result that the peak forces arising from operation of the machine will be materially reduced.

As shown in Fig. 7, curve A represents the deflection plotted against the load for columns having laterally supported ends and corresponding to the columns 64 herein described. Curve B is a deflection curve of a stiff spring mounting such as spring 46. Curve C represents the deflection plotted against the loading of a typical shock mount as herein illustrated in which the column 64 and the coil springs 46 are in series. The point 106 on the curve C indicates the deflection of the system corresponding to a load of about 375 pounds representing the dead weight load applied to the platform. When additional load is applied to the mount due to operation of the machine the increased loading results in deflection of the platform according to curve at the portions between 106 and 108 during which the columns and springs act in series with a comparatively low combined spring scale. Thus, during this period of the cycle the deflection increases rapidly. When, however, the columns 64 engage the ends 78 of the slots in the plates 48 the columns are stiffened and do not appreciably deflect any further. The moving machine mass is then decelerated by action of the comparatively stiff coil springs 46 as indicated by the curve C from the point 108 upwardly and to the right in Fig. 7.

Mounts of the construction above-described thus provide means, readily adaptable, to various types of floor conditions for damping vibrations resulting from the operation of the machines supported.

Having thus described my invention what I claim as new and desire to secure by Letters Patent of the United States is:

1. A vibration damping mount for machines comprising a base, a plurality of bowed resilient struts extending upwardly from the base, a hanger supported by the upper ends of the struts, a platform suspended from the hanger, and springs operatively connecting the hanger and platform for transmitting to the struts forces applied to the platform.

2. A vibration damping mount for machines comprising a base, a plurality of inwardly bowed resilient rods extending upwardly from the base, a hanger supported by the upper ends of the rods, a platform suspended from the hanger, springs operatively connecting the hanger and platform for transmitting to the rods forces applied to the platform, and a plate carried by the hanger and having portions engaging each of the rods for controlling the stiffness of the rods under a load applied to the platform.

3. A vibration damping mount for machines comprising a base, a plurality of inwardly bowed resilient rods extending upwardly from the base, a hanger supported by the upper ends of the rods, a platform suspended from the hanger, springs operatively connecting the hanger and platform for transmitting to the rods forces applied to the platform, a plate carried by the hanger having portions engaging each of the rods for controlling the stiffness of the rods under a load applied to the platform, and means for securing the plate selectively in predetermined positions heightwise of the rods for varying the stiffness of the rods under different loads.

4. A vibration damping mount for machines comprising a base, a plurality of inwardly bowed resilient rods extending upwardly from the base, a hanger carried by the upper ends of the rods, a platform supported by the hanger, springs operatively connecting the platform and hanger for transmitting to the rods forces applied to the platform, and abutments located between the rods having portions for engaging the rods constructed and arranged to arrest the deflections of the rods upon application of a dynamic load to the platform.

5. A vibration damping mount for machines comprising a base, a plurality of inwardly bowed resilient rods extending upwardly from the base, a hanger supported by the upper ends of the rods, a platform suspended from the hanger, springs operatively connecting the hanger and platform for transmitting to the rods forces applied to the platform, means carried by the hanger engaging each of the rods for controlling the stiffness of the rods under a static load applied to the platform, and abutments located between the rods for arresting deflections of the rods under a dynamic load applied to the platform.

6. A vibration-damping mount for machines comprising a base, a plurality of columns extending upwardly from the base, a crosshead supported upon the upper ends of the columns, a hanger depending from the cross head, a plurality of rods slidably mounted in the hanger, means for limiting downward movements of the rods relatively to the hanger, a spring abutment carried at the lower ends of the rods, a second spring abutment located between the first-mentioned abutment and the hanger, a plurality of springs between and in engagement with the spring abutments, a platform, and means operatively connecting the platform and the second-mentioned spring abutment for supporting the platform above the base.

LAWRENCE E. STEIMEN.

REFERENCES CITED

The following references are of record in the file of this patent:

UNITED STATES PATENTS

| Number | Name | Date |
|---|---|---|
| 1,003,579 | Bandroft | Sept. 19, 1911 |
| 1,893,295 | Bailly | Jan. 3, 1933 |
| 1,988,295 | Berry | Jan. 15, 1935 |
| 2,200,561 | Rosenzweig | May 14, 1940 |
| 2,456,612 | Baudry | Dec. 21, 1948 |